April 4, 1967   G. D. ROCKEFELLER, JR   3,312,866
DISTANCE RELAY ACTUATED PHASE COMPARISON RELAYING DEVICE
Filed Aug. 26, 1964   5 Sheets-Sheet 1

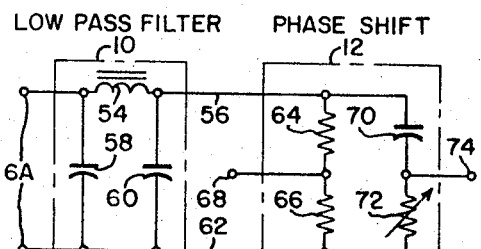
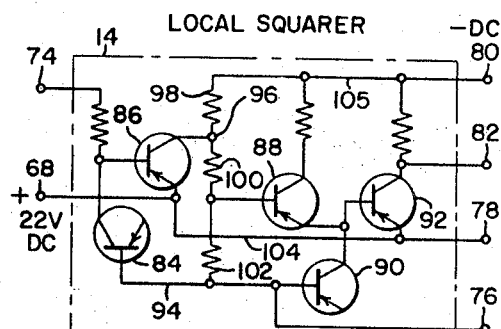
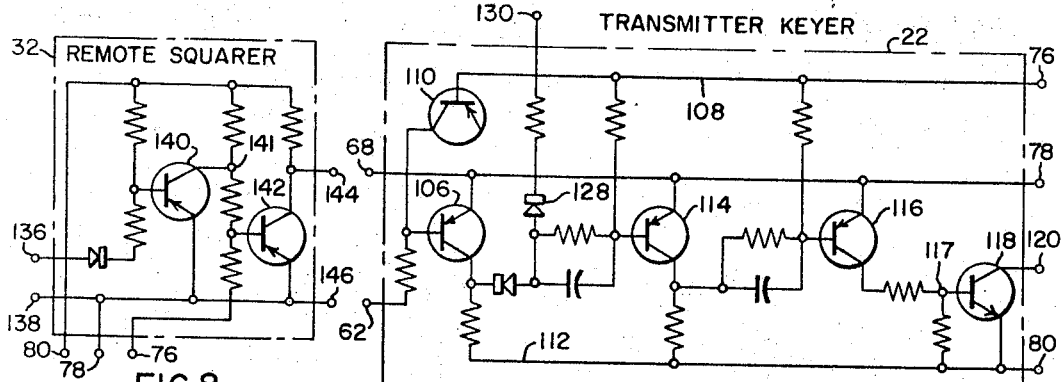
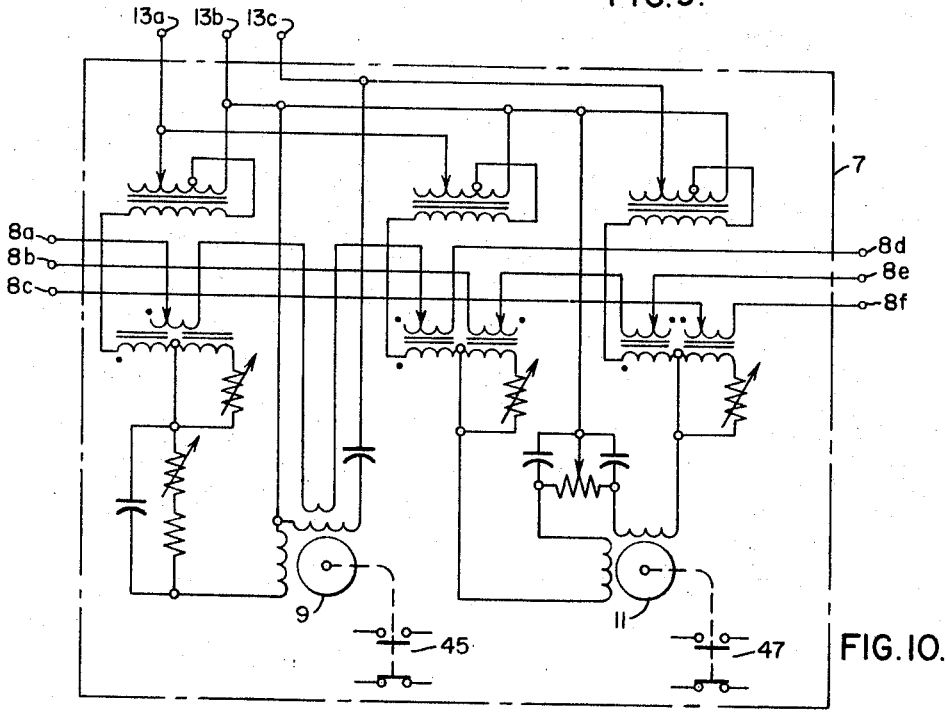

United States Patent Office 3,312,866
Patented Apr. 4, 1967

3,312,866
DISTANCE RELAY ACTUATED PHASE COMPARISON RELAYING DEVICE
George D. Rockefeller, Jr., Morris Plains, N.J., assignor to Westinghouse Electric Corporation, Pittsburgh, Pa., a corporation of Pennsylvania
Filed Aug. 26, 1964, Ser. No. 392,126
12 Claims. (Cl. 317—28)

This invention is similar in some respects to the invention disclosed in the copending application of Conrad T. Altfather, Ser. No. 378,552, filed June 29, 1964, for Phase Comparison Relaying Device and assigned to the same assignee as is this application. The invention relates generally to phase comparison carrier relaying devices and more particularly to the use of distance fault relays or detectors for initiating the operation of such relaying devices.

In the usual phase comparison carrier relay the fault is sensed by a current sensing network which provides a pulsating or alternating single phase output quantity. The magnitude of this quantity is used to determine the presence of fault current in the protected line section and phase of this quantity is used to locate the fault.

When the magnitude of the network output reaches a predetermined value which is determinative of the existence of a fault, the relaying device emits a series of spaced signals which are phased by the direction of the current flow at the location of the relaying device.

The protected line section is provided with a similar relaying device at each end thereof and each device responds to the fault current at its location whereby it emits its own series of individually phased spaced signals. The emitted signals are transmitted between the two or more relaying devices by suitable means such as by a carrier wave transmitted along one of the conductors of the protected line section, by a separate wire interconnecting the two relaying devices, by microwave transmission, etc.

If the fault is within the protected line section, the fault currents at each end thereof will be in the same direction (inwardly at each end into the protected line section) and the phase of the transmitted signals will be such that the relaying devices trip their adjacent breakers to isolate the faulted line section. If the fault is external to the protected line sections, the fault current at each end thereof will be in the opposite directions (inwardly at one end and outwardly at the other end of the protected line section) and the phase of the transmitted signals will be such that the relaying devices will not trip their adjacent breakers.

In many instances this type of relaying is most satisfactory, however, under certain instances as for example in the case of three phase faults the magnitude of the single phase output quantity of the sensing network (indicative of a fault current flow) is for practical purposes indistinguishable from the magnitude due to a heavy but permissible load current. In such an event, the relaying apparatus would become actuated when no fault is present. This results in the energization of the transmitters at each relaying device and the needless transmission of signals between the sets of relaying devices to prevent tripping of the associated breakers.

The needless transmission is undesirable for many reasons. For example, it may cause false tripping of one or more breakers in the event of the failure of component parts of the apparatus and it prevents the use of the transmitting facilities for purposes of transmitting other intelligence or operating signals between the various relaying stations.

It is therefore an object of this invention to provide an improved protective relaying system in which the relaying devices will be actuated when a fault occurs but will not be actuated by permissive load current magnitudes.

It is a further object of this invention to provide a phase comparison protective relaying system which is highly sensitive to the occurrence of line faults but which will not be actuated by transmissions of permissible load current.

Another object of this invention is to provide a protective relaying system for use on transmission lines utilizing series capacitors.

A still further object is to provide such a relaying system which is unaffected when the series capacitor is effectively removed by an arc-over of the capacitor gaps during the fault.

A still further object is to provide a phase comparison protective relaying system which uses distance type relays as fault detectors for sensing three phase line faults.

A further object of this invention is to provide a phase comparision relaying system which will be highly sensitive to the occurrence of faults but which will not be falsely actuated by permissible load current.

Other objects of the invention will be apparent from the description, the appended claims and the drawings in which:

FIGS. 6, 7, 8, 9, 10 and 11 are schematic circuits which may be used in certain of the blocks of the diagram of FIG. 1; and, FIG. 12 is a partial schematic circuit useful in understanding the invention.

Figure 2:
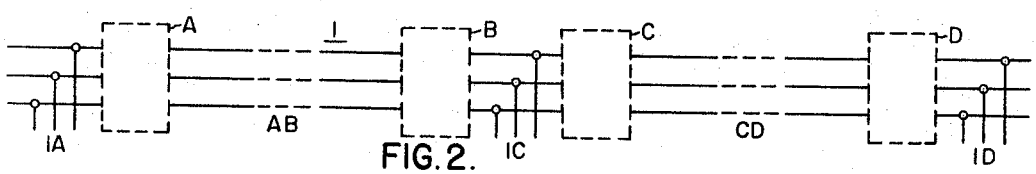
FIGS. 2 and 3 are block diagrams illustrating different types of transmission lines protected with the devices of FIG. 1.
Figure 3:
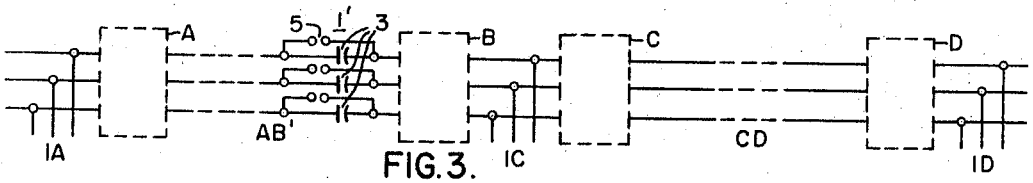

Referring to the drawings by characters of reference, the numeral 1 represents generally a three-phase power distribution network. As illustrated in FIG. 2, the network 1 comprises first and second protected line sections AB and CD. Line section AB is connected at opposite ends to busses 1A and 1C by breakers at locations A and B. Line section CD is connected to busses 1C and 1D by breakers at locations C and D. The network 1' of FIG. 3 is identical to the network 1 of FIG. 2 except that series line capacitors 3 have been inserted in the line section AB' to provide inductive compensation whereby the line section is capable of transmitting greater amounts of power. The series capacitors 3 are provided with flashover gaps 5 in the usual manner which flashover as a consequence of an excessive current through the line section AB'.

Figure 1:
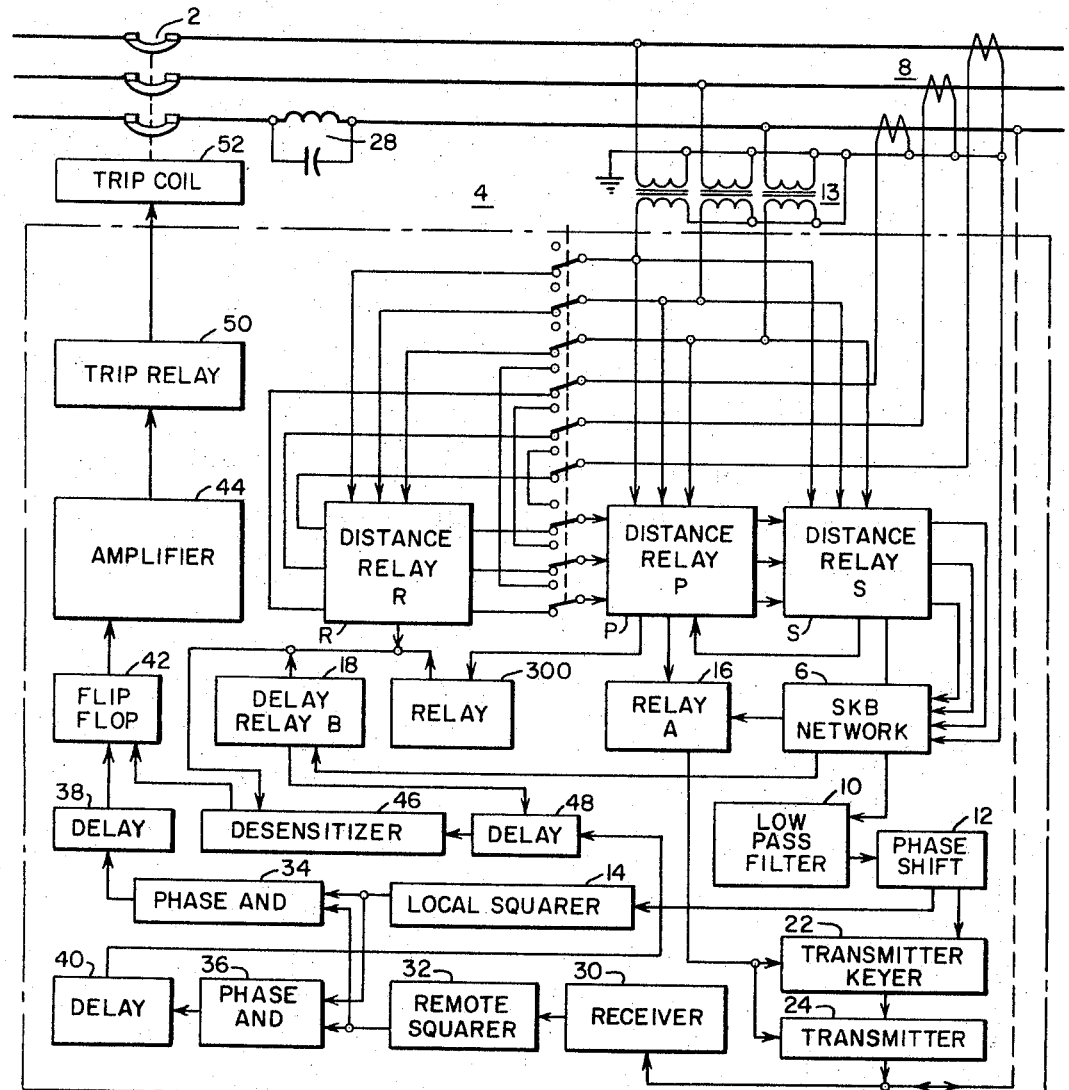
FIGURE 1 is a block diagram of an improved relaying device.

The breakers 2A and 2B of locations A and B are individually controlled by relaying devices 4 which sense the existence of a fault in the distributing network or system 1. A typical relaying device 4 is illustrated in FIG. 1 and includes a network 6 which is energized as a function of the current flow at the portion of the protected line section to which it is attached. For some types of faults, the magnitude of the single phase output quantity of the network 6 is sufficiently greater than the magnitude which occurs during load current flow through the line section to permit use of the magnitude of the output quantity to sense and actuate the relay devices 16 and 18 whereby they serve as the fault sensor as set forth in the Altfather application. In the case of other types of line faults, as for example a three phase fault, the magnitude of the single phase quantity can actually be lower than the magnitude at an unfaulted permissible power current. For such instances, this invention contemplates the use of distance type relays P and S for fault detection as will be explained in greater detail below. In line sections utilizing series capacitors, a third distance relay R is sometimes desirable.

The network 6 may take many desired forms. A suitable network, identified in applicant's drawing as a SKB network, could be like the HCB network shown and described in Lensner Patent No. 2,406,615. The network 6 is energized by means of a current transformer array 8 to provide an alternating potential output signal (as for example that taken between the terminals 19 and 20 of said Lensner patent). This single phase quantity is supplied through a low pass filter 10 and a phase shifting network 12 to a local squaring amplifier 14 which squares the wave shape and amplifies the signal applied thereto.

As illustrated in said Lensner patent the SKB network 6 may have a unidirectional potential signal component that is supplied by the rectifier network 23 of the said Lensner patent. This latter signal component is supplied to a pair of relay devices 16 and 18. The devices 16 and 18 are illustrated as being magnetic relays but may of course take other forms. The operation of the relay 18 is delayed with respect to the operation of the relay 16 by at least a predetermined time interval. This delay in the operation of the relay device 18 may be caused by a suitable electrical delaying means such as the capacitor 20 (FIG. 12) or may be due to the construction of the device itself. In many instances it is desirable to adjust the relay 18 so that it will operate at a somewhat higher output voltage of the SKB network than is required for operation of the relay 16.

When the relay 16 operates, it transfers the control of a suitable transmitter 24 over to the network 6. The transmitter 24 is of the type which provides a carrier signal which may be switched on and off by the network 6 connected thereto through a transmitter keying circuit 22 which is also normally held in a condition to prevent the transmitter 24 from transmitting its signal by the relay 16. The transmitter 24 supplies the relaying device 4 at the opposite end of the protected line section with intelligence concerning the direction of the current flow at the first end of the line section.

As illustrated, the output or carrier signal of the transmitter 24 is applied to one of the conductors of the protected line section in the manner taught in the Lensner patent. The signal could of course be transmitted as an airborne radio signal or along a separate pilot wire or otherwise as long as the intelligence reaches the companion relaying device 4. The output signal of the transmitter 24 is prevented from entering other than the desired line portion or section by the filter networks 28 which readily pass the low frequency (for example 60 cycle per second) power but substantially completely block the flow of the higher frequency output of the transmitter 24.

The relaying device 4 is further provided with a receiver 30 tuned to receive the output signal from the transmitter of the associated or comparison relaying device 4 spaced from the adjacent device 4 by the line section to be protected. While under some conditions it may be desirable for the transmitters of the associated relaying devices to be tuned to different frequencies whereby the receiver of the sending one of the devices 4 will not receive the signal transmitted by the transmitter 24 of the same relaying device 4, the usual operation is to have the transmitters 24 and receivers 30 of both of the associated devices 4 tuned to the same frequency. Under the latter operation, the local receiver 30 will receive the signals of the local as well as the remote transmitter.

The output of the receiver 30 is squared and amplified by a remote squaring amplifier 32. The squared amplified outputs of the local and remote squaring amplifiers 14 and 32 are each supplied to phase AND networks 34 and 36 which, as will be explained below in greater detail, serve to pass an effective signal to the respective delay networks 38 and 40 when the relative phase angle between the output signals of the amplifiers 14 and 32 is below a predetermined magnitude and to prevent such a passage and consequent timing out of the delay networks when the phase angle is greater than this predetermined magnitude.

The delay network 38 is connected to actuate a flip-flop or switching network 42 which controls the input of an amplifier 44. The delay network 40 is connected to a desensitizing network 46 through a delay network 48. As will be explained in greater detail below, the desensitizing network 46 normally maintains the flip-flop or switch 42 ineffective to actuate the amplifier 44 and trip the associated breaker 2.

The fault detectors P, R and S may be identical and are illustrated as being a conventional distance relay schematically shown in FIG. 10 of this application. Distance relays 7 of this general type form the subject matter of U.S. Patent No. 2,973,459 to W. K. Sonnemann, wherein they are described and claimed. The particular form of the relay 7 is not important as far as this invention is concerned so long as they will be actuated in response to the occurrence of faults along a predetermined length of an electrical line. Each distance relay is provided with fault responsive control devices 9 and 11 which individually actuate normally open and normally closed contact sets 45 and 47, respectively, upon the occurrence of a three phase fault or a phase to phase fault respectively within its "reach" distance to which the relay is adjusted. The necessary current and voltage signals are derived from the current and voltage transformer arrays 8 and 13 and supplied to the current and voltage input terminals 8a, 8b, 8c and 13a, 13b, 13c, respectively.

In order that the current signal for the distance relays P, R and S as well as the network 6 may be derived from the single current transformer array 8, the relays are provided with current output terminals 8d, 8e and 8f. When a three phase fault occurs within the "reach" distance of the three phase fault detecting portion of the relay, the relay or actuator 9 is energized to close its normally open contacts and open its normally closed contacts of the set 45. Similarly when a phase to phase fault or phase to phase to ground fault occurs within the "reach" distance of the phase to phase fault detecting portion, the actuator 11 is energized to actuate its contact set 47.

Figure 12:
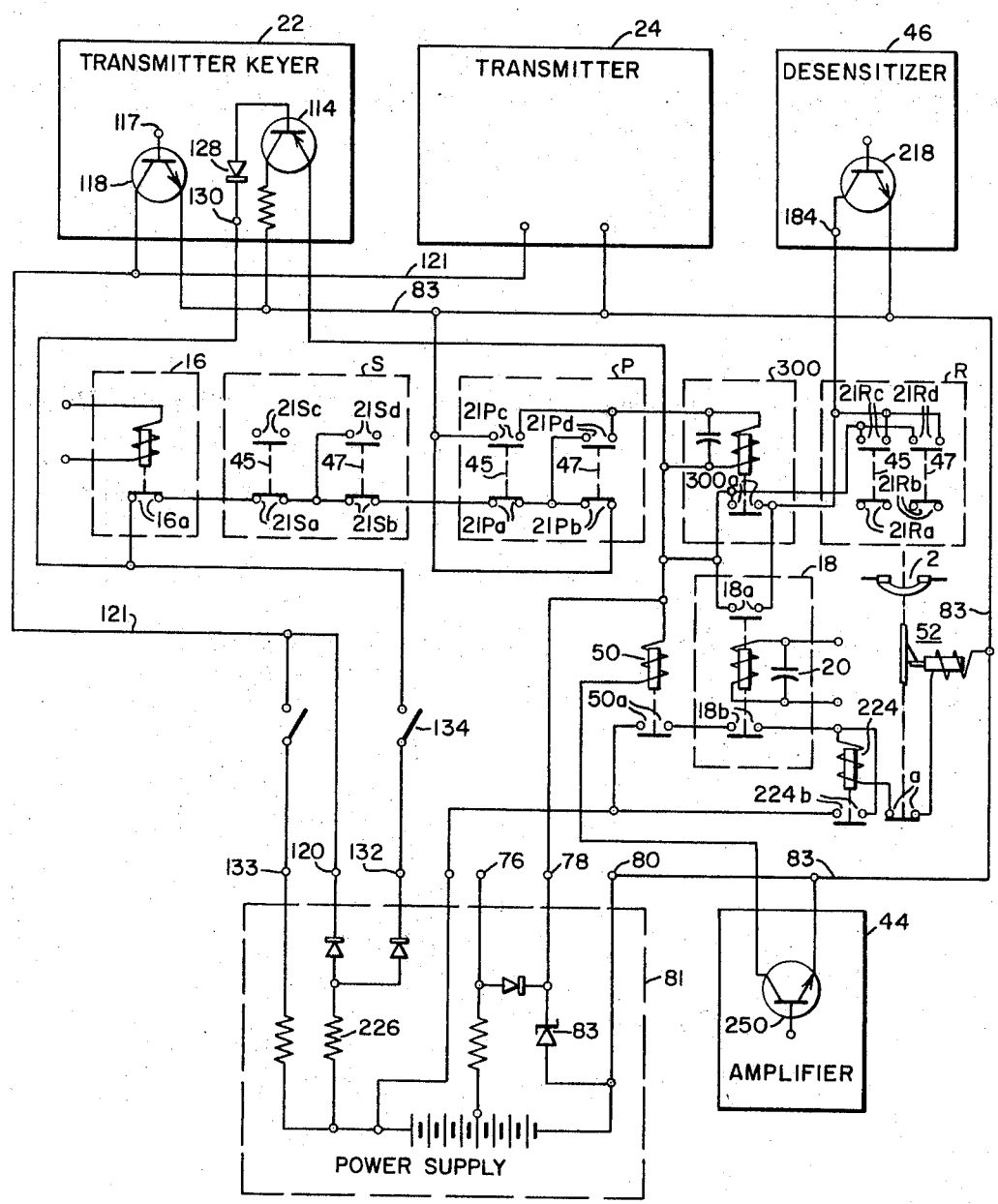

As illustrated in FIG. 12, the normally closed contacts 21Sa and 21Pa of the contact sets 45 of the S and P relays are connected in series with the normally closed contacts 21Sb and 21Pb of the contact sets 47 of the S and P relays and in series with normally closed contacts 16a of relay 16. Therefore, the opening of any of the normally closed contacts 16a, 21Sa, 21Sb, 21Pa and 21Pb disconnects the terminal 132 from the negative terminal 80 to permit the terminal 120 and bus 121 to supply positive potential to the transmitter 24 and keyer 22. When so energized, the SKB network 6 causes the transmitter 24 to be actuated by the keyer 22 in a manner apparent from the description of operation set forth above in connection with a fault sensed by the SKB network.

In order to sensitize the flip-flop 42, the normally open contacts 21Pc and 21Pd are effectively connected in parallel with the normally open contacts 18a of the relay 18 because of the action of relay 300. More specifically the relay 300 is energized to close its normally open contacts 300a upon closure of the normally open contacts 21Pc or 21Pd of relay P. This causes the contacts 300a, which are connected in shunt with the normally open contacts 18a, to close and the desensitizer 46 to place the flip-flop 42 under control of the phase AND network 34. A time delay should occur between closure of the contacts 21Pc or 21Pd and contacts 300a. This may be provided in numerous ways and is diagrammatically shown as being caused by the capacitor connected in shunt across the winding of the relay 300.

In the event that a line fault is sensed by the network 6 or by one or more of the distance relays, the desensitizing network 46 is promptly actuated to sensitize the flip-flop 42 to place it in condition to respond to the output signal, if any, of the delay network 38. If the fault is internal to the section AB, the phase of the signals supplied by the amplifiers 14 and 32 is not greater than the predetermined critical angle and, after a delay of about .004 seconds, a signal indicative of an internal fault within the protected line section AB is supplied to the amplifier 44. Upon energization, the amplifier 44 will energize the trip relay 50 which in turn actuates the usual trip coil 52 of the associated breaker 2 to disconnect the line section from the adjacent bus. If, however, the fault which caused operation of the relay 18 is external to the line section AB, the delay network 38 will not time out. In this event, it is desired that the desensitizing network 46 be returned to its initial position for desensitizing the flip-flop network 42 so that it will not respond to spurious or transient signals which might be transmitted through the delay network 38.

In order that the relaying apparatus 4 may respond to an internal fault which occurs subsequently to an external fault, the delay network 48 is connected to be reset to its non-timed-out or initial condition by the timing out of the delay network 40. This resetting actuates the desensitizing network 46 to sensitize the flip-flop network 42. Since the delay network 40 can time out only because of the actuation of the phase AND network 36, and the phase AND network 36 can only be actuated for this purpose in the event of the occurrence of a local fault, the flip-flop 42 will be resensitized only if a local fault occurs and will not be resensitized by the external fault.

The low pass filter 10 (FIG. 6) may take any desired form in which electrical signals having a frequency at or below the critical frequency of the filter may be passed therethrough. In the illustrated form shown in FIG. 6 the low pass filter is of pi-type and includes an inductance 54 series connected in the conductor 56 and a pair of capacitors 58 and 60 which are individually connected from opposite ends of the inductance 54 to the other conductor 62. The signal passed by the filter 10 is supplied to the phase shift network 12 which may take any of varied forms but which is illustrated in FIG. 6 as comprising a pair of series connected resistors 64 and 66 and a capacitor 70 series connected with a variable resistor 72. The series circuits are connected between the conductors 56 and 62 and are provided with an output terminal 68 at the common point of the resistors 64 and 66 and an output terminal 74 between the capacitor 70 and variable resistor 72. By varying the magnitude of the resistance of the resistor 72, the phase of the output voltage at the terminals 68 and 74, with respect to that of the voltage between the conductors 56 and 68, may be controlled.

The output voltage from the terminals 68 and 74 is applied to the like numbered terminals 68 and 74 of the local squaring amplifier 14. For purposes of simplicity the terminals which are connected together will be designated by the same reference characters whereby the interconnecting of the figs. will be apparent. The local squarer 14 (FIG. 7) may take any of many varied forms in which the input signal is amplified and squared and supplied to a pair of output terminals 80 and 82. In the illustrated embodiment, the local squarer 14 comprises a plurality of transistors 84, 88, 90 and 92. Power for the amplifier is provided from the terminals 78 and 80 of a power supply or source 81 (FIG. 12). The terminal 80, as indicated, is the minus D.C. terminal. The terminal 78 is supplied with a regulated positive direct current potential which, for example, may be maintained at 22 volts and may be derived through a voltage dropping resistor from a 45 volt tap of a suitable battery such as a station battery under control of a Zener diode 85. The supply 81 is also provided with an output terminal 76 which is connected to the like numbered terminal of the squarer 14. The local squarer 14 is rendered substantially unaffected by changes in the temperature thereof by the transistor 86, the base of which is connected to the terminal 76 through the collector and base of the transistor 84 and conductor or bus 94. It will be noted that the emitter of this transistor 84 is not connected. Similarly the base of the transistor 92 is connected through the collector and base of the transistor 90 to the bus 94.

The conduction of the transistor 86 is controlled by the output of the phase shift network 12 and is arranged to conduct during the half cycle output of the phase shift network 12 in which the input terminal 74 is negative with respect to the input terminal 68. When the transistor 86 conducts, collector current flows through the transistor 86 and effectively connects the terminal 96 intermediate the resistors 98 and 100 of the series connected resistors 98, 100 and 102 to the positive bus 104. The resistors 98, 100 and 102 are connected between the ground or negative bus 105 and the positive bus 94. Therefore, the conduction of the transistor 86 connects the terminal 96 to the bus 104, and thereby raises the potential of this terminal 96 to the potential of the 22 volt bus 104 so that transistors 88 and 92 become nonconducting. When transistor 92 becomes nonconducting, the potential of the output terminal 82 becomes substantially that of the negative potential bus 80.

When transistor 86 is blocked by the output potential of the phase shifter 12, the potential of the terminal 96 is reduced sufficiently below that of the bus 104 to cause transistors 88 and 92 to conduct, thereby raising the potential of the output terminal 82 to approximately that of the bus 104 whereby current is caused to flow through corresponding diodes 107 and 109 of the phase AND networks 34 and 36 as will be explained in greater detail below.

The transmitter keying circuit 22 (FIG. 9) is actuated by the electrical quantity flowing through the low pass filter 10 and the resistor 66 of the network 12 as indicated by the like numbered input terminals 62 and 68 of the transmitter keying network 22. Power for the keying network is obtained from the power supply 81 (FIG. 12) through the like numbered power input terminals 76, 78 and 80. The circuit 22 is rendered nonresponsive to temperature changes by connecting the base of transistor 106 to the bus 108 through the collector and base of a transistor 110.

During one-half cycle of the input voltage supplied to the input terminals 62 and 68, the transistor 106 conducts, and during the opposite half cycle it is rendered nonconducting. When the transistor 106 is nonconducting the potential of its collector is substantially at that of the negative potential bus 112 whereby the transistor 114 is maintained conducting. When the transistor 114 conducts, the transistor 116 and 118 are held nonconducting and the output connection or terminal 120 is disconnected from the negative bus 80. The opening of the circuit between the terminal 120 and bus 80 permits the transmitter to transmit its output signal. The keying circuit 22 is provided with a control terminal 130 (FIGS. 9 and 12), which in the absence of a fault, is connected through normally closed contacts 16a, 21Sa, 21Sb, 21Pa and 21Pb to the negative terminal 80 through bus 83. This connection maintains the transistor 114 normally conducting and prevents any conduction of the transistor 118 and reduction of the potential of bus 121 due to operation of the keying circuit 22 but permits operation of the transmitter 24 by control of the switch 134 which may be manually operated to energize the transmitter from source terminal 133 for test or other purposes without preventing operation of the transmitter 24 for fault purposes.

A squelch circuit such as the circuit 124 of the Altfather application may be used if desired to prevent operation of the local transmitter for a predetermined interval after operation of the local breaker.

When the receiver 30 receives a signal from the transmitter 24 of the other relaying device, a signal is transmitted to the input terminals 136 and 138 of the remote squaring amplifier 32. This signal acts to cycle the normally conducting transistor 140 whereby it pulsatingly energizes its output terminals 144 and 146 with a square wave of voltage. Power for operating the remote squaring circuit 32 is derived from the power supply 81 as indicated by the terminals designated 76, 78 and 80. When the normally conductive transistor 140 is blocked, the potential of terminal 141 is sufficiently low to permit the flow of base current through the transistor 142 to hold the potential of the output terminal 144 at substantially that of the positive supply terminal 78. When the potential across the input terminals 136 and 138 reverses, transistor 140 will conduct, the potential of the terminal 141 will be raised to substantially that of the positive terminal 78 and transistor 142 will be rendered non-conducting whereby the potential of terminal 144 is reduced to substantially that of the negative terminal 80. The terminal 144 is connected with an input terminal to each of the phase AND networks 34 and 36.

Figure 11:
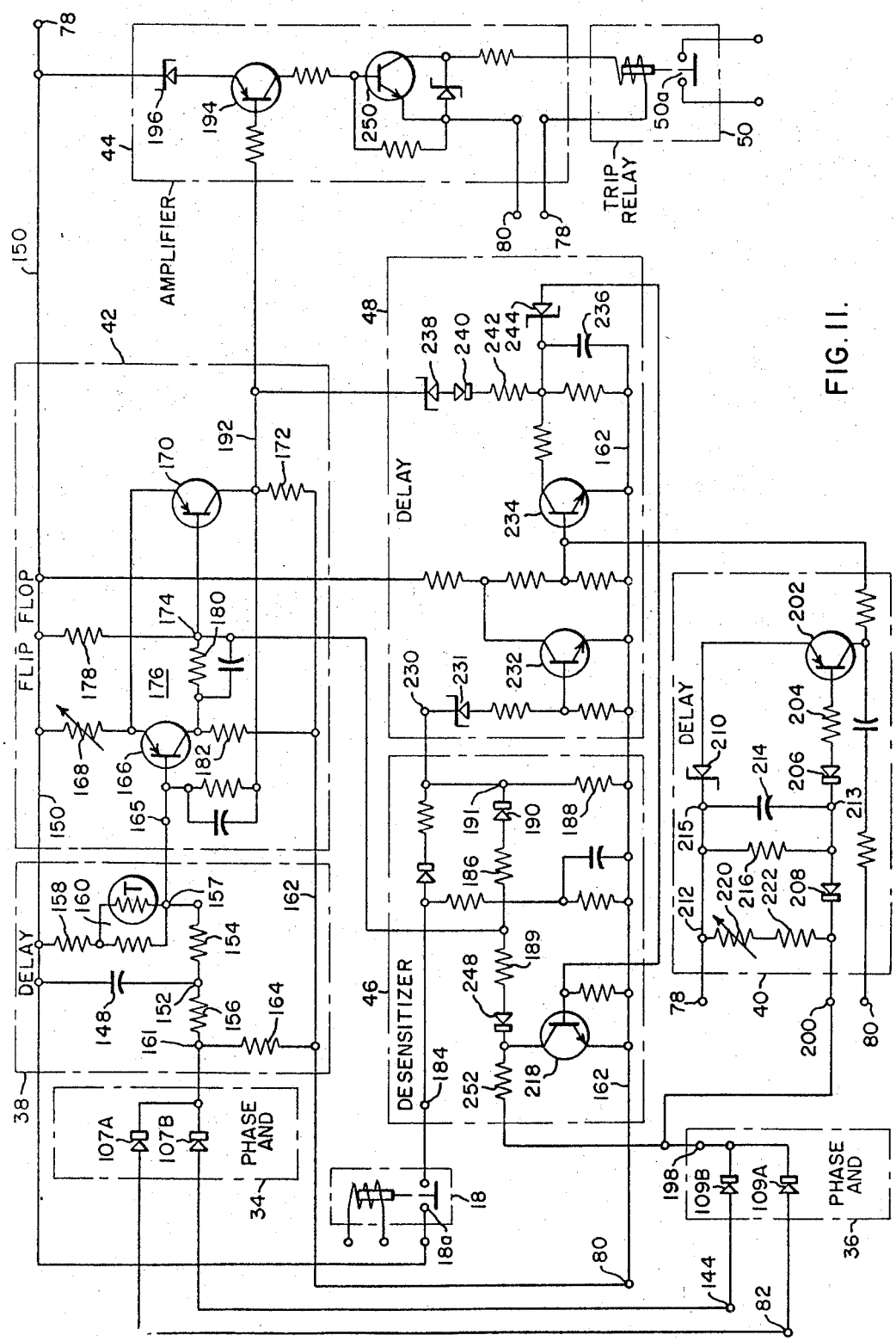

Referring now more specifically to FIG. 11 of the drawings wherein the details of other of the circuits are illustrated, it will be apparent that the phase AND circuits 34 and 36 are substantially identical and each is provided with two input terminals and a single output terminal. The input terminals are connected to the output terminals through individual diodes (107A, 107B, 109A and 109B) whereby only the positive half cycles of any voltage applied thereto will be transmitted through the phase AND circuit to its output terminal. The output terminal of the phase AND circuit 34 is connected to terminal 161 of the delay network 38.

One terminal of a capacitor 148 of network 38 is connected to a positive bus 150 which, as indicated by the reference character 78, is connected to the 22 volt positive connection 78 of the power supply 81. The other terminal of the capacitor 148 is connected to a common terminal 152 between a pair of series connected resistors 154 and 156. The opposite terminal 157 of the resistor 154 is connected through another resistor 158 to the positive bus 150 in shunt with the capacitor 148. A temperature compensating resistance network 160 may be connected in series between the terminal 157 and the resistor 158. This resistance network 160 comprises a positive temperature characteristic resistor shunted by a negative temperature characteristic resistor such as a thermistor resistor. The terminal 161 of the resistor 156 spaced from a terminal 152 is connected to the negative bus 162 through a resistor 164. With no potential being supplied to the input terminal 161, the capacitor 148 will be charged to a potential intermediate, that of the busses 150 and 162 as determined by the relative values of the resistors of the delay network 38.

The potential supplied by the squaring amplifiers 14 and 32 to the phase AND networks 34 and 36 is derived from and is substantially the same as that of the positive potential supply terminal 78 to which the bus 150 is connected, therefore, whenever a potential is supplied to the input terminal 161 from the phase AND circuit 34, the capacitor 148 starts to discharge through the shunting resistors 154, 158 and 160. The values of these resistors 154, 158 and 160 is preferably chosen with respect to the value of the capacitor 148 so that the capacitor 148 will completely discharge during the timing out of the delay network or capacitor 20 (FIG. 12). For a purpose which will be made clear below, the value of the resistors 156 and 164 are so chosen that the capacitor 148 will receive a critical charge in a very short interval as for example 4 milliseconds (90 degrees at a 60 cycle per second frequency). Typical values of the magnitudes of the resistors in ohms for a 22 volt potential at terminal 78 are as follows: resistor 154—22K; 156—4.7K; 158—5.6K; 160—15K and a 1D101 thermistor; and 164—47K;

The terminal 157 is the output terminal of the delaying network 38 and is connected to the input terminal 165 of the flip-flop or switching network 42. The network 42 comprises a pair of transistors 166 and 170 and circuitry which is arranged such that when the network 42 is sensitized, conducting of transistor 166 causes the normally conducting transistor 170 to block but when the network 42 is desensitized the transistor 170 continues to conduct. The base of the transistor 166 is connected to the input terminal 165. The emitter is connected to bus 150 through a resistor 168 which may be variable if desired and which resistor determines the extent of the charge on the capacitor 148 which is necessary to cause the transistor 166 to conduct. The collector is connected to the negative bus 162 through a resistor 182 and to a control terminal 174 through a resistor 180 of an RC network. The terminal 174 is connected to the base of the normally conducting transistor 170. The emitter of this transistor 170 is connected to the positive bus 150 through the resistor 168 and the collector is connected to the negative bus 162 through a resistor 172. The potential of the terminal 174 and of transistor 170 is determined jointly by a potential dividing network 176, comprising the resistors 178, 180 and 182 and a second dividing network comprising the resistors 178, 186, 188 and 189. The values of the resistors of the voltage dividing network 176 and of the resistor 168 are so chosen that, with no current flowing through the transistor 166, the potential of the terminal 174 is sufficiently below that of the emitter of transistor 170 that the transistor 170 will remain conductive. In order to further insure continued conduction of the transistor 170 if the transistor 166 should conduct when no internal fault is present, the values of the resistors 178, 186 and 188 are so chosen that, with the desensitizing input terminal 184 deenergized, the potential of the terminal 174 is sufficiently low to prevent blocking of the transistor 170 even though the transistor 166 should conduct. Typical magnitudes of the resistance in ohms of the resistors are as follows: 168—1K; 172—4.7K; 178—10K; 180—22K; 182—4.7K; 186—4.7K; 188—6.8K; and 189—10K.

As will be explained below, the shunt connection through the resistors 186 and 188 and diode 190 of desensitizer network 46 will exist until the occurrence of a fault, either internal or external, and the resulting timing out of the delay 20 to operate the relay 18, before which operation the flip-flop network 42 cannot render the transistor 170 blocked due to transients or otherwise. As will be made clear below, the transistor 218 is held nonconductive until the occurrence of, and for a predetermined time period subsequent to the occurrence of a fault external or internal. During this predetermined time period after contacts 18a close and before transistor 218 conducts because of the operation of the delay network 48 there will be no current flow through resistor 186 since the potential of the terminal 191 intermediate the diode 190 and resistor 188 will be at or above the potential of the bus 150. This condition permits the potential of the terminal 174 to become sufficiently positive so that conduction of transistor 166 and the consequential increase in potential drop across resistor 168 will cause a lowering of the potential of the emitter of transistor 170 below that of its base and the consequent blocking of the transistor 170. If the transistor 166 does not conduct during this predetermined interval because the fault is external rather than internal, the transistor 218 will conduct and the resulting current flow will lower the potential of terminal 174 (desensitize the flip-flop 42) sufficiently to prevent blocking of transistor 170 because of conduction of transistor 166.

The collector of the transistor 170 is connected to a bus 192, the potential of which will primarily be determined by the conductive condition of the transistor 170. This bus 192 is the output connection of the flip-flop 42 and is connected through a current limiting resistor to the base of a transistor 194 of the amplifier 44. When transistor 170 conducts, the potential of the bus 192 and of the base of this transistor 194 is sufficiently close to that of the positive bus 150 so that the potential therebetween is less than the breakover potential of the breakover device or Zener diode 196 and transistor 194 will be maintained nonconductive. A suitable breakover voltage for this diode could be 6.8 volts.

The input terminal 200 of the delay network 36 is connected to the output terminal 198 of the phase AND network 36. This delay network includes a timing element or capacitor 214 which controls the initiation conduction of a normally nonconducting transistor 202. The base of the transistor 202 is connected through a resistor 204 and a diode 206 to one terminal 213 of the timing capacitor 214. The emitter of the transistor 202 is connected through a voltage breakover device or Zener diode 210 to the other terminal 215 of the capacitor 214 and to the positive bus 212 which is energized by the power supply as indicated by the commonly identified terminals 78. A resistor 216 is connected in shunt with the capacitor 214 to discharge the same at a controlled rate. The charged condition of the timing capacitor 214 is controlled by the phase AND circuit 36 and the conductive condition of the transistor 218, and is connected to remain below a critical charge as long as the output terminal is energized by the phase AND network 36 but to progressively charge through the resistor 252 and transistor 218 of the desensitizer during the half cycles that the terminal 198 is not energized by the phase AND network 36.

In order to control the rate at which the capacitor 214 charges to its critical charge a pair of resistors 220 and 222 are connected in shunt with the timing capacitor 214 and resistor 216 through a diode 208. It will be apparent that the current flow through the resistor 252 is the sum of the charging current of the timing capacitor and the current through the resistor 220. Therefore, a change in the magnitude of the resistance of the resistor 220 results in a change in the rate at which the capacitor 214 can attain its critical charge. Preferably the time required for the capacitor 214 to attain its critical charge is longer than a single time period provided by the phase AND network 36 and which may be and preferably is as short as one and one half time periods when such time periods are consecutive.

Figure 4A:
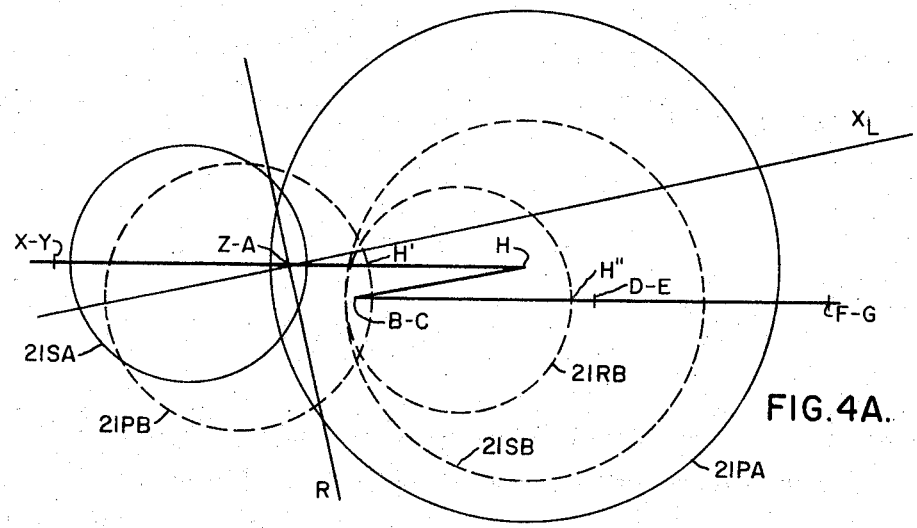
FIGS. 4A and 4B are diagrammatic representations of a transmission line having a series capacitor and protected in accordance with the teaching of this invention.

FIG. 4A illustrates, by means of an RX circle diagram, the operating characteristics of certain of the distance relays utilized in practicing the invention. The characteristics are those for relays located at the end portions or locations A and B of the line section 1' of FIG. 3 which line section includes series capacitors. The R and X axes have been rotated from the normally used position to bring the line X–G, representing the transmission line impedance, into a position in which it extends transversely of the drawing. This rotation permits a simplified representation of the relay operating characteristics at the locations C and D as well as at the locations A and B without unduly complicating the figure. The series capacitors 3 are physically located closely adjacent the breaker or location B on the side thereof toward location A. In the diagrammatic representation, as set out in FIG. 4A, they are represented by the line portion H–B.

As illustrated by the circle diagram, relay S at location A is adjusted to be actuated by any three phase fault which might occur in the portion of the line X–G which is located within the circle 21SA, which illustrates the "reach" of the distance relay. This includes at least as much of the line section Y–Z as is included by the circle 21PB. Likewise the relay P at location A is sensitive to the same faults which occur within the portion of the transmission line located within the circle 21PA. The circles 21PB, 21SB and 21RB illustrate the portions of the line X–G which when subjected to a three phase fault will cause actuation of the corresponding relay P, S or R at location B.

Figure 4B:
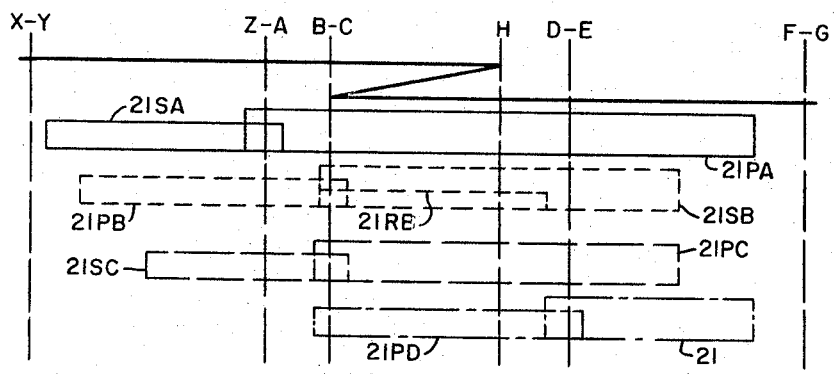

Since we are primarily interested in the intersection of the line X–G with the circles representing the operating characteristics of the relays P, R and S, sometimes called the "reach" of the relay, the characteristics are illustrated in FIG. 4B by rectangles which are located longitudinally to the line X–G and are of a length indicative of the "reach" of the relay or the length of the line to which the corresponding relay is sensitive. This representation simplifies the drawings without detracting from the explanation of the invention.

Figure 5:
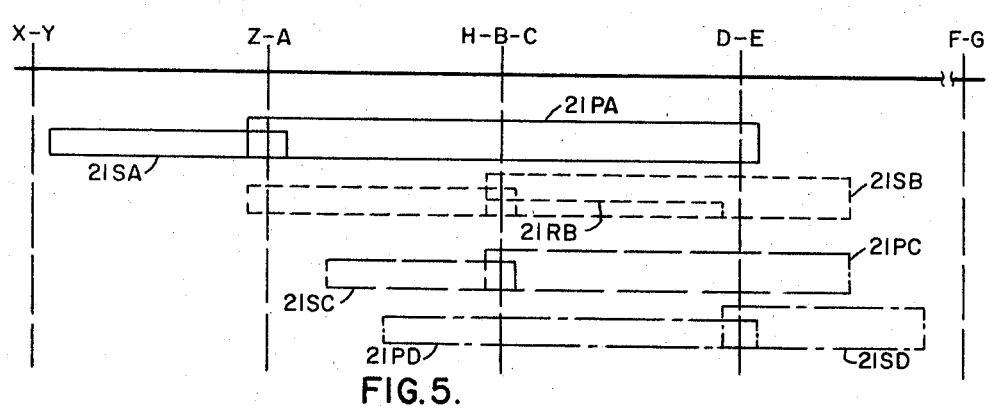
FIG. 5 is a view similar to FIG. 4B but illustrating a line with the series capacitor effectively removed from the line.

FIG. 5 is a representation of the transmission line X–G when the capacitor protective gaps 5 are arcing. This arcing essentially eliminates the effect of the series capacitors and the point B moves to point H. The line section C–D of FIG. 5 is representative of the line sections network 1 of FIG. 2 and of typical adjustments of the "reach" of the distance relays.

It is believed that the remainder of the details of construction may best be understood by a description of the operation of the device which is as follows: under normal faultless operating condition of network 1, relays 16 and 18 and distance relays P and S, and R if used, will be in their "no-fault" condition as illustrated in FIG. 12. If load current is sufficiently high, an A–C quantity may be supplied to the local squaring amplifier 14 and through the phase AND network 34 to the delay network 38. The capacitor 148 will be alternately charged and discharged but, because of the desensitized condition of the flip-flop 42, this will not result in the blocking of the transistor 170 even though the transistor 166 may do some conducting. The normally closed contacts 16a of relay 16, the normally closed contacts 21Sa and 21Sb of the relay S and the normally closed contacts 21Pa and 21Pb of the relay P will all remain closed. The circuit so established connects the terminal 132 directly to the negative bus 83. This holds the terminal 120 and the bus 121 at ground potential and prevents energization of the transmitter keyer 22 and the transmitter 24. This circuit also maintains the transistor 114 of the transmitter keying circuit conductive and prevents any operation of the transmitter 24 by the SKB network 6.

In order to simplify the description, the operation of the apparatus in response to a phase to ground fault will first be described. This type of fault, as well as some others causes the SKB network 6 to supply an alternating potential quantity of fault magnitude. The magnitude of a rectified portion of this quantity is substantially greater than that caused by the maximum load current through the protected line section and is supplied to the relay 16. When this occurs, the relay 16, without substantial time delay, opens its contacts 16a. This rectified quantity is also supplied to the relay 18 which is arranged to actuate its contacts not less than a minimum time interval subsequent to actuation of the contacts 16a. As illustrated, this time delay is provided by the capacitor 20 which is connected in shunt with the winding of the relay 18. If desired, the relay 18 may be designed to require a somewhat greater operating voltage than that required by the relay 16.

When the relay 16 opens its normally closed contacts 16a (FIG. 12), it disconnects the terminal 132 from the negative bus 83 to permit the potential of terminal 120 of the power supply 81 to rise whereby potential is supplied to the transmitter 24 and to the keying circuit 22. Opening of the contacts 16a also interrupted the base circuit through the diode 128 to place the transistor 114 under control of the transistor 106 (FIG. 9) which in turn is controlled by the output signal of the phase shift network 12. The transistor 106 will be rendered nonconductive during each of alternate half cycles whereby the transistor 114 is periodically blocked and the transistor 118 is periodically rendered conducting to cause the transmitter 24 to transmit a signal to the receiver 30 of the remote device 4 only during the periods in which the transistor 118 is blocked.

When the time delay or capacitor device 20 times out, the relay 18 will close its normally open contacts 18a and 18b (FIG. 12). Closure of the contacts 18b is merely preparatory and has no immediate effect.

Closure of the contacts 18a elevates the potential of the terminal 184 of the desensitizing network 46 and terminal 230 of the delay network 48 (FIG. 11). Elevation of the potential of the terminal 184 to substantially 22 volts effectively elevates the potential of the terminal 191 and thereby the terminal 174 of the flip-flop network 42 whereby conduction of the transistor 170 is placed under control of the transistor 166.

If, during the timing out interval of the delay 20, the receiver 30 does not receive a signal to cause the remote squarer 32 to energize the phase AND network 34 during the time interval that no signal is being supplied thereto by the local squarer 14 the capacitor 148 will remain or be charged to its critical value so that the transistor 166 will either continue to be conducting or become conducting. Since as described above closure of contacts 18a sensitizes the flip-flop 42, the transistor 170 will become blocked when the transistor 166 conducts. Blocking of the transistor 170 reduces the potential across the resistor 172 whereby the potential of bus 192 approaches that of the negative bus 80. This increases the potential difference between the base and emitter of the transistor above the breakover voltage of the device 196 and transistor 194 becomes conductive. This conduction causes base drive current to flow through the transistor 250 which is thereby rendered conductive to energize the trip relay 50 which closes its contacts 50a.

As illustrated in FIG. 12, closure of contacts 50a completes the energizing circuit of trip coil 52 through the winding of the relay 224 which closes its contacts 224b. Closure of contacts 224b closes a circuit in shunt with the contacts 50a and 18b thereby sealing the relay 224 and the breaker trip coil 52. When the breaker 2 opens its main contacts to disconnect the line section it also opens its associated a contacts. Opening of the a contacts opens the sealing circuit of the trip coil 52 and of the relay 224 which thereupon becomes deenergized.

If the fault is external to the line section CD, the receiver 30 will be energized by the transmitter 24 of the remote device 4 to phase the output pulses of the remote squaring amplifier 32 such that the phase AND network 34 provides a continuous or substantially continuous output. This output substantially continuously maintains the potential of the terminal 161 at substantially the potential of the bus 150 thereby permitting the capacitor 148 to discharge below its critical value. Therefore, unlike the case of the internal fault, the transistor 166 will be maintained in its nonconducting condition whereby the flip-flop network 42 will not flip and the breaker will not be actuated to disconnect the line section.

If the flip-flop 42 remained sensitized subsequent transients which may accompany the clearing of external faults could falsely actuate the relay device 4 and unnecessarily and undesirably disconnect the line section CD. To avoid this, the flip-flop 42 is desensitized at the end of a desired time interval following its sensitization. This interval is determined by the delay network 48. The timing out of this network 48 is initiated by closure of the relay contacts 18a which elevated the potential of its control terminal 230. This elevation is sufficient to cause a breakover of the device 231 and base current to flow in the transistor 232 of the delay network 48. The resulting conduction of transistor 232 terminates the conduction of the companion transistor 234.

During the interval that the transistor 234 was conducting, it maintained the timing capacitor 236 discharged. The blocking of the transistor 234 initiates the charging of the capacitor 236 through a circuit which extends from the conductor 192 through the voltage breakover device 238, diode 240, resistor 242 and capacitor 236 to the negative bus 162. The capacitor 236 reaches its critical charge at the end of the timing interval of the time delay 48. When this occurs, the voltage breakover device 244 will breakover to cause base drive current to flow through the base of the transistor 218. When transistor 218 conducts it completes a circuit from the terminal 174 through resistor 189 and diode 248 to the negative bus 162. This current flow reduces the potential of the terminal 174 as described above and desensitizes the flip-flop so that the transistor 170 is no longer controlled by the conductive condition of the transistor 166. The interval that the timing device or capacitor 236 is being charged represents the initial interval in which the flip-flop network or switching network 46 can respond to the output of the phase AND circuit 34 for tripping the amplifier 44.

In the event an internal fault occurs subsequent to the occurrence of an external fault and of the timing out of the delay network 48, the flip-flop circuit 42 is resensitized at the end of a predetermined time delay as provided by the delay network 40. This delay network 40 provides a time delaying interval which is longer than any expected transient which might falsely trip the relay device and assures that the apparent internal fault is a true internal fault. The network 40 times out in response to a change in the relative phase of the output voltages applied to the phase AND network 36 by the squarers 14 and 32.

During the external fault, the phase angle of the outputs of the squaring amplifiers 14 and 32 was such that either the terminal 82 or the terminal 144 was at a positive potential at substantially the entire time so that the potential of the output terminal 198 was substantially always maintained at the elevated potential. This elevation in potential prevented charging current flow to the timing capaictor 214. Upon the occurrence of the subsequent internal fault, the direction of fault current flow through the transformer array 8 reverses and shifts the phase of the output voltage supplied by the SKB network 6 of the relaying device 4. Therefore, when this internal fault occurs, the phase of the output voltage of the remote squaring amplifier is shifted to substantially that of the local squaring amplifier whereby the potential of the terminal 198 is elevated for only a portion of the cycle of the voltage of the protected network which portion is usually 180° of the alternating output of the SKB network 6. The capacitor 214 will receive charging current from the positive bus 212 when the phase AND network 36 does not supply substantially 22 volts to the terminal 200 of the delay network 40. The charging circuit of the capacitor 214, extends from the terminal 78, through the capacitor 214, the diode 208, resistor 252, collector to emitter of the transistor 218 and the negative bus 162 to the negative terminal 80 of the power supply 81. Since, as set forth above, the capacitor 214 cannot be charged to its critical potential during the cycle portions in which the terminal 200 is not elevated, the desensitizer 46 is not actuated at this time. During the next cycle portion in which the terminal 200 is elevated in potential, only a portion of the charge supplied is discharged so that during the second cycle portion in which the terminal 200 is not elevated in potential, the increment of charge received is sufficient to raise the stored charge to the initial value which will cause the breakover device 210 to breakover and render the transistor 202 to conducting.

When the transistor 202 conducts, it elevates the potential of the base of the nonconducting transistor 234 of the delay network 48 causing it to become conducting and discharge the timing capacitor 236. The discharging of transistor 236 occurs very rapidly. When the potential across the capacitor 236 has been reduced substantially to a potential just below the breakover potential of the device 244 it ceases to conduct and terminates further flow of base current to the transistor 218. This causes the potential of the terminal 174 to elevate and return the control of transistor 170 to the transistor 166.

At the same time that the phase AND network 36 was actuating the delay network 40, the phase AND network 34 was timing out the delay network 38. The timing of the delay 38 is preferably of shorter duration than that of the delay network 40 so that by the time that the flip-flop 42 is resensitized the delay network 38 will have timed out and the transistor 170 will block when the flip-flop 42 is sensitized. As explained above, the rendering of the transistor 170 blocked lowers the potential of the conductor 192, and the transistors 194 and 250 conduct and energize the trip relay 50, relay 224, and energize the trip coil 52 to trip the breaker 2 as described above.

In many instances the magnitude of the single phase output quantity of the SKB network 6 for a three phase fault is greater than the magnitude caused by any permitted load current through the line section and in such instances the foregoing described operation works satisfactorily for three phase faults as well as for phase to ground, phase to phase, and phase to phase to ground faults. In other instances the magnitude of the single phase output quantity of the SKB network which occurs because of a three phase fault may actually be less than the magnitude of the quantity at permitted higher unfaulted load supplying conditions and in such instances the relays 16 and 18 could be needlessly and undesirably operated.

An example of such an instance is when the power being sent through the transmission line is below the maximum capacity of the transmission line and the capacity of the generating equipment supplying the busses 1A, 1B, 1C is less than that required to supply the full rated load through the transmission line. In such event the voltage at one or more of the busses 1A, 1B, 1C will not be maintained at the rated voltage, because of voltage drops in the current paths supplying the busses and/or because of the internal impedance of the generating apparatus. Therefore, even though the protected line section was subjected to a low impedance three phase short, the resulting current flow into the protected section could be so small that the single phase output quantity of the SKB relay is actually considerably less than when more generators are connected and more power is being transmitted over the transmission line. In some instances it might be possible to readjust the relaying devices each time changes are made in the number of alternators connected to supply the busses or with changes in power transmitted over the protected line sections but such a course of action is undesirable for many reasons. Therefore, if the relays 16 and 18 are adjusted to respond to all three phase faults, which is necessary if the line section is to be properly protected, the relaying device 4 will become actuated at permissible unfaulted load power transmitting conditions.

Under certain phase to phase faults which may occur adjacent the end of the protected line section remote from the location of the connection of the particular SKB network 6 to the line section, the difference in magnitudes of the single phase output quantities of the network 6 which occur as a consequence of heavy load and of a fault is too small to insure proper operation of the relays 16 and 18 for the fault magnitude and without operation at heavy loads. In such instances, to insure operation of the relays 16 and 18 at fault conditions, the relays 16 and 18 may operate at heavy faultless power transmitting conditions.

Such an actuation of the relaying devices 4 when no fault occurs would not result in the tripping of the associated breakers 2 since the operation would appear as an external fault. Such an actuation would, however, result in the unnecessary and undesirable operation of the transmitters. This is undesirable because, first, if the comparison took place continuously, failure of a component in the carrier equipment might result in the immediate tripping of one or both terminals of the protected line section; secondly, the carrier channel would not be available for other services; and thirdly, a continuous transmission over extended periods of time could result in interference with the transmission of intelligence in adjacent or associated equipment.

In its generic scope, this invention contemplates the use of distance relays to supplement the relays 16 and 18 whereby the relaying device 4 can distinguish between a three phase fault at low power and a heavy permissible transmission of power through an unfaulted line. To accomplish this result in a line without series capacitors, as for example the network 1 of FIG. 2, each of the devices associated with the line sections to be protected includes a pair of distance relays. One of the distance relays P is "forward looking" and when actuated performs the function of both of the relays 16 and 18. As will be discussed below, the "reach" of this relay P is adjusted to cause relay P to respond as closely as possible solely to faults which occur within the line section to be protected thereby. If the fault is beyond this adjacent or protected line section, the adjacent breaker should not be actuated. If it were possible to adjust the distance relays P so that they would respond as desired, no additional fault sensing protector would be necessary. In fact, it would be unnecessary to resort to the more expensive and more complicated phase comparison relaying system. Since the P relays cannot be so adjusted, the "reach" of the P distance relays is extended a distance sufficiently beyond the end of the protected section to be sure that the P relays will always respond to three phase faults occurring within this protected section. With such an arrangement the P relays may respond to three phase faults occurring outside of the protected section. To prevent this response from undesirably tripping the breakers, S distance relays are provided. They are adjusted so that their "reach" extends into the adjacent line sections. For example, the operating characteristic or "reach" of the S relay at location D must extend into the line section EF a distance which is equal to or greater than the distance that the operating characteristic or "reach" of the P relay at location C extends into the line section EF. This relationship is illustrated in FIG. 5 by the distance or "reach" representing rectangles 21SD and 21PC.

The relays S are effective to start operation of the transmitters but are uneffective to trigger or sensitize the flip-flop switch 42. This latter effect cannot cause any operation of the breaker 2 associated with the relay device 4 which is actuated by the particular S relay. The operation of the transmitter provides the companion relay device with a fault locating signal as described above. This fault locating information, as described above, prevents operation of the breaker 2 with the fault located in line section EF.

While the invention, in its generic form as has been discussed above, is applicable to transmission lines without series capacitors, it has particular applicability with respect to transmission lines having such series capacitors. Such a line is illustrated in FIGS. 3 and 4. With the distance relays P and S at locations A and B set as described above, it will be apaprent that relay PB does not reach the line section H'-H of the protected section AB and cannot be actuated by a three phase fault in the portion H'-H. Since it is undesirable for various reasons to enlarge the circle 21PB to reach this line portion, an additional distance relay R is provided at location B. Relay RB is adjusted to respond to three phase faults within the circle 21RB and is arranged, as illustrated in FIG. 12, to sensitize the flip-flop 42 of the relaying device 4B (the device 4 at location B). In the event of a fault in section H'-H the relay 21SB will energize the transmitter 24 of the relay device 4B to provide a signal which together with the signal of the transmitter 24 of device 4A (actuated by relay PA) will determine that the fault is located in line section A–B. The sensitizing of the flip-flop 42 of the device 4B by relay RB permits the device 4B to open or trip the associated breaker 2B. The flip-flop 42 of the device 4A was sensitized by the relay PA and since the fault was located as being in line section A–B the breaker 2A was opened.

If the fault had occurred in line section C–H' of line section CD (which is external to line section AB), the operation of the relays PA, RB and SB would have been the same as just described but the SKB networks indicate that the fault current is into the line section AB at location A and out of the line section AB at location B and consequently an external fault. In this event, the phase of signals from the transmitters 24 at locations A and B prevent operation of the breakers 2A and 2B.

In the foregoing it has been assumed that the capacitor arcing gaps 5 have not flashed over and the characteristics of the line section AB remained as illustrated in FIG. 4. In many instances this will not be the case and the terminals 5 will arc across (because of the magnitude of the fault current) so that the characteristic of the line section AB becomes that illustrated in FIG. 5. The operation of the relay devices 4A and 4B will be the same as described but the portions of the line X–G reached by the relays P, R and S will be somewhat different, as shown in FIG. 5. The relays P, R and S, which protect the line section AB, must, therefore, be set differently from that described in connection with setting of the relays which protect the line section CD, which line section contains no series capacitors.

The preferred settings for the relays P, S and R at locations A and B are illustrated in FIG. 4A. Briefly, the "reach" of the relays RB, SB and SA should be adjusted so that the circle 21RB includes point H, the circle 21PA outreaches the circle 21RB, and the circle 21SA outreaches the circle 21PB when the series capacitors are effective as illustrated. The characteristics of the relays PA and PB should be adjusted so that with the capacitor gaps 5 flashed over the circle 21PA includes the circle 21RB and the circle 21PB includes the point A.

It will be apparent from the above that relays PC and PD will respond to faults occurring in line section H'–H which are external to the line section CD as well as responding to internal faults occurring in line section CD. The breakers 2C and 2D will not be actuated when the fault is in line section H'–H but will when the fault is in line section CD because of the fault locating operation of the SKB networks and their control over the signals transmitted between the relay devices 4C and 4D.

Although the invention has been described with reference to restricted embodiments thereof, numerous modifications are possible and it is desired to cover all modifications falling within the spirit and scope of the invention.

What is claimed and what is desired to be secured by United States Letters Patent is as follows:

1. In a relay device for use in protecting a transmission line section, a transmitter adapted to supply first and second output signals as a consequence of the application thereto of first and second input signals respectively, a switch actuatable from a first to a second operating condition as a consequence of the application of a control signal thereto, desensitizing means connected to said switch and normally maintaining said switch ineffective to be actuated by said control signal, current actuated means including a current network operably connected to said transmitter, said current actuated means being operable as a consequence of current flow through said current network in first and second directions to supply said first and said second input signals to said transmitter, a control network having first and second input connections and an output connection, means connecting said output connection to said switch to render said switch actuatable by said control network, said control network being effective to actuate said switch from its said first to its said second condition solely when first and second input quantities are applied to said first and second input connections, circuit means connecting said current network to said first input connection whereby said control network, said current network being effective to supply said first input quantity to said input connection as a consequence of current flow through said current network, a signal receiver operatively connected to said second input connection, said receiver being effective to supply said second input quantity solely when actuated in a predetermined manner with respect to the direction of current flow supplied to said current network, first and second distance relays, each said relay including a control device actuated as a function of the combined magnitude of voltage and current quantities supplied thereto, circuit means interconnecting said control devices of said first and said second distance relays to said transmitter, whereby said transmitter is actuated to supply one of its said output signals as determined by the direction of current flow through said current network, and circuit means connecting solely one of said first and said second distance relays to said desensitizing means, said one distance relay being effective in response to a predetermined relationship of the said voltage and current quantities supplied thereto to render said switch effective to be actuated by said control network.

2. The combination of claim 1 in which there is provided a third distance relay, said control device of said third relay being connected solely to said desensitizing means and effective in response to a desired relationship of said voltage and current quantities supplied thereto to render said switch effective to be actuated by said control network.

3. The combination of claim 2 in which said desired relationship and said predetermined relationship of said current and said voltage quantities are different.

4. The combination of claim 1 in which said circuit means which connects said one distance relay to said desensitizing includes means to delay the rendition of said switch actuable by said control network for a desired time interval subsequent to the actuation of said transmitter by a said distance relay.

5. The combination of claim 4 in which said means which delays the rendering of said switch actuatable by said control network includes a relay means.

6. A phase comparison relaying apparatus comprising a transmitter having control terminals and output terminals operable to transmit first and second output intelligence bearing signals solely when first and second input intelligence bearing signals are supplied to its said control terminals, a current sensitive network having an input circuit and an output circuit, said output circuit being connected to said control terminals, said current network being effective to energize said control terminals with said first input signal when the current flows in said input circuit in a first direction and with said second input signal when the current flows in said input circuit in a second direction, a receiver providing first and second output intelligence bearing signals in response to the reception of first and second receiver input signals, a switch having an actuator and effective when actuated by its said actuator to control an external circuit, a desensitizer connected to said switch and normally effective to render said switch ineffective to be actuated by its said actuator, a control network having two input circuits and an output circuit, said control network output circuit being connected to said switch actuator and effective to supply a switch actuating signal to cause said actuator to control said external circuit, circuit means connecting one of said control network input circuits to said receiver whereby said receiver output signals are supplied to said control network, circuit means connecting the other of said control network input circuits to said current network whereby said current network signals are supplied to said control network, said control network being operable to supply its said switch actuating signal solely when its said two input circuits are energized by a preselected combination of the said signals supplied by said receiver and said current sensitive network, a pair of fault detectors, each of said fault detectors having voltage and current input connections and a switching device actuated when the ratios of the magnitudes of the voltage and current applied to its said input connections reaches a predetermined quantity, circuit means operatively connected to said transmitter and including said switching devices of said fault detectors, said just-named circuit means being effective upon actuation of either of said switching devices of said fault detectors to render said transmitter effective to transmit its said signals under control of said current network, and circuit means connected to said desensitizer and including said switching device of one of said pair of fault detectors, said last-named circuit means being effective upon actuation of said switching device of said one fault detector to actuate said desensitizer whereby said switch is effective to be actuated by its said actuator in response to said switch actuating signal of said control network.

7. The combination of claim 6 in which a first of said fault detectors responds to faults located in the first quadrant of an R-X diagram along the impedance curve which represents the phase angle between the current and voltage supplied to its said input connection and the second of said fault detectors responds to faults located along said curve in the fourth quadrant of said R-X diagram.

8. The combination of claim 7 in which said one fault detector is said first fault detector.

9. The combination of claim 6 in which said phase comparison relaying apparatus is located substantially at the interconnection of first end portion of a first section of a transmission line with a second end portion of a second section of said transmission line, first circuit means operatively connecting said first end portion of said line section to said input circuit of said current sensitive network and said input connections of said fault detector for supplying current to said current network and current and voltage to said fault detectors which current and voltage are representative of the current and voltage flowing in said first end portion of said first line section, said one fault detector being operable to respond to all of certain faults occurring within said first line section and to said certain faults which occur in said second line section within a first portion thereof adjacent said first line section, the other of said fault detectors being operable to respond to all of said certain faults occurring in said second line section portion.

10. The combination of claim 9 in which said transmission line includes a third line section having an end portion connected to the other end portion of said first line section and in which there is provided a second said phase comparison relaying apparatus connected to said other end portion of said first line section in the same manner as the said phase comparison relaying apparatus is connected to said first end portion of said first line section, said one fault detector of said second comparison apparatus being operable in response to said certain faults occurring in all said first line sections and in a second portion of said second line section, said other fault detector of the said comparison apparatus which is connected to said first end portion of said first line section being operable to respond to said certain faults in said first and second portions of said second line section, each of said one fault detectors being operable in response to faults in portions of said third line section adjacent said first line section, said other fault detector of said second comparison apparatus being operable in response to said certain faults occurring in said portions of said third line section.

11. The combination of claim 10 in which said receiver of one of said phase comparison apparatus is actuated by said output signals of said transmitter of the other of said phase comparison apparatus and vice versa, said first and second output signals of said transmitters being phased relative to the current flow through said line section such that said preselected combination occurs solely when the fault is within said first line section.

12. In combination a transmission line having a section to be protected located intermediate the ends thereof, a first end portion of said section being connected to a first adjoining portion of said line through a first breaker and a second end portion being connected to a second adjoining portion of said line through a second breaker, said section including series connected capacitance for inductive compensation of such magnitude and so located that when the impedance of said line is plotted on an R-X diagram with the impedance of said line section in the first quadrant and said first end portion at the origin and with the impedance of said first adjoining portion lying in the third quadrant, an intermediate portion of said section will lie in said first quadrant substantially further from the origin than said second end portion, a plurality of fault detectors having the characteristics of a distance relay and having an actuated device actuated in response to a predetermined relation of the voltage and current supplied thereto, means connecting a first and a second of said detectors to said first end portion of said line section whereby voltage and current quantities are supplied to said first and second detectors which are proportioned to the voltage and current in said first end portion of said line section, said first detector being operable to actuate its said actuated device upon the occurrence of a certain fault in a portion of said line which is represented by a portion of the impedance curve of said line which lies primarily in said first quadrant, said second detector being operable to actuate its said actuated device upon the occurrence of said certain fault in a portion of said line which is represented by a portion of the impedance curve of said line which lies primarily in said fourth quadrant, means connecting a third and a fourth and a fifth of said detectors to said second end portion of said line section whereby voltage and current quantities are supplied to said third, fourth and fifth detectors which are proportional to the voltage and current in said second end portion of said line section, said third detector being operable to actuate its said actuated device upon the occurrence of said certain fault in a portion of said line which is represented by a portion of said impedance curve which lies in said first quadrant and is not substantially further outwardly from said origin than said second end portion of said line section, and in a portion of said line which is represented by a portion of said impedance curve which lies in said fourth quadrant and which extends a lesser distance from said origin than said portion which is operable to actuate said actuated device of said second detector, said fourth detector being operable to actuate its said actuated device upon the occurrence of said certain fault in a portion of said line which is represented by a portion of said impedance curve which lies in said first quadrant and which extends sufficiently from said origin to include any portion of said curve which represents said line section and which lies further from said origin than said portion which actuates said third detector, said fifth detector being operable to actuate its said actuated device upon the occurrence of said certain fault in a portion of said line which is represented by a portion of said impedance curve which lies outwardly of said origin beyond said portion covered by said fourth detector, a first breaker control controlling said first breaker, a second breaker control controlling said second breaker, intelligence transmitting means interconnecting said breaker controls and operable to transmit intelligence between said breaker controls, means connecting said transmitting means to said end portion of said line section to be energized as a function of the current flow at said end portion, means normally maintaining said intelligence transmitting means ineffective, means interconnecting said actuated devices of said first, second, third and fifth detectors with said transmitting means whereby said transmitting means is rendered effective upon the actuation of at least one of said just-listed detectors, breaker control operating means interconnecting said breaker controls and said intelligence transmitting means, said breaker control operating means being operable to cause any of said first and second breaker controls to actuate the said breaker with which it is associated solely when the direction of the fault current at said end portions of said line section is concurrently into and concurrently out of said line section, means normally rendering said breaker control operating means ineffective and means interconnecting said breaker control operating means and said actuated devices of said first and said third and said fourth detectors whereby said breaker control actuating means is rendered effective to respond to said intelligence transmitting means upon the actuation of at least one of said first and said third and said fourth detectors.

No references cited.

MILTON O. HIRSHFIELD, *Primary Examiner.*

J. D. TRAMMELL, *Assistant Examiner.*